United States Patent
Ogawa

(10) Patent No.: US 12,405,794 B2
(45) Date of Patent: Sep. 2, 2025

(54) SIGNAL PROCESSING APPARATUS AND NON-TRANSITORY COMPUTER-READABLE STORAGE MEDIUM

(71) Applicant: CANON KABUSHIKI KAISHA, Tokyo (JP)

(72) Inventor: Takeshi Ogawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 18/329,738

(22) Filed: Jun. 6, 2023

(65) Prior Publication Data
US 2023/0409323 A1  Dec. 21, 2023

(30) Foreign Application Priority Data
Jun. 21, 2022 (JP) ................. 2022-099799

(51) Int. Cl.
  *G06F 9/30* (2018.01)
  *G06F 9/38* (2018.01)
  *G06F 15/80* (2006.01)

(52) U.S. Cl.
  CPC ...... *G06F 9/30134* (2013.01); *G06F 9/30098* (2013.01); *G06F 9/30105* (2013.01); *G06F 9/3012* (2013.01); *G06F 9/3885* (2013.01); *G06F 15/8076* (2013.01); *G06F 15/8092* (2013.01)

(58) Field of Classification Search
  CPC ............ G06F 9/30134; G06F 9/30098; G06F 9/30105; G06F 9/3012; G06F 9/3885; G06F 15/8076; G06F 15/8092
  See application file for complete search history.

(56) References Cited

U.S. PATENT DOCUMENTS

| | | | | |
|---|---|---|---|---|
| 5,481,746 A | * | 1/1996 | Schiffleger | G06F 15/8084 712/E9.034 |
| 7,546,444 B1 | * | 6/2009 | Wolrich | G06F 9/30127 712/228 |
| 11,977,509 B2 | * | 5/2024 | Master | G06F 5/01 |
| 2006/0020768 A1 | * | 1/2006 | Toda | G06F 9/3867 712/E9.063 |
| 2017/0322813 A1 | * | 11/2017 | Langhammer | G06F 9/3869 |

FOREIGN PATENT DOCUMENTS

JP   4222808 B2   2/2009
JP   2011-089913 A   5/2011

* cited by examiner

*Primary Examiner* — Corey S Faherty
(74) *Attorney, Agent, or Firm* — Cowan, Liebowitz & Latman, P.C.

(57) ABSTRACT

This invention provides a signal processing apparatus which comprises a CPU and a programmable signal processor which has a plurality of execution units, a register file having a plurality of registers connected serially, and a shift controller which issues a shift signal to shift data held in the register file when each of the execution units has completed execution of a program of one cycle. Each of the execution units, after the execution of the program of one cycle, re-executes the program in accordance with the reception of the shift signal. The CPU stores, to a program memory in each of the execution units, a program including instructions to store data of a result of processing to one of registers so that the other execution unit refers the data in next cycle.

14 Claims, 16 Drawing Sheets

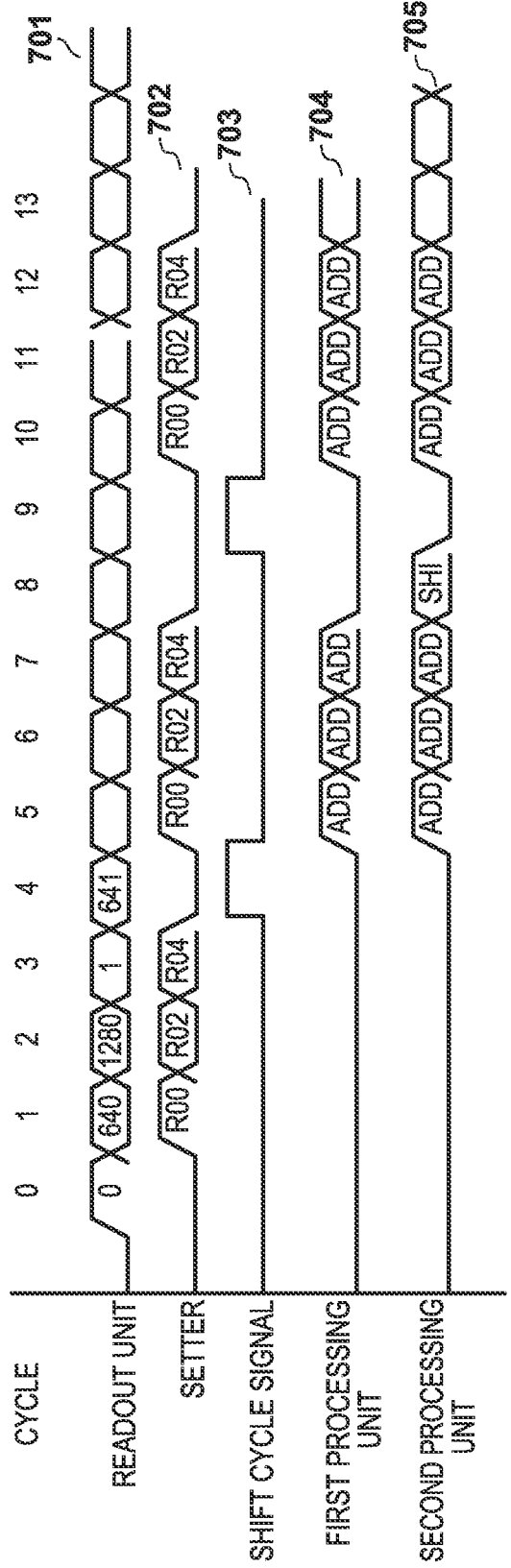

WITHOUT DOUBLE BUFFER,
CONSISTENCY OF DATA SET IS BROKEN

DOUBLE BUFFER IS USED TO
CHANGE DATA SET IN ONE CYCLE

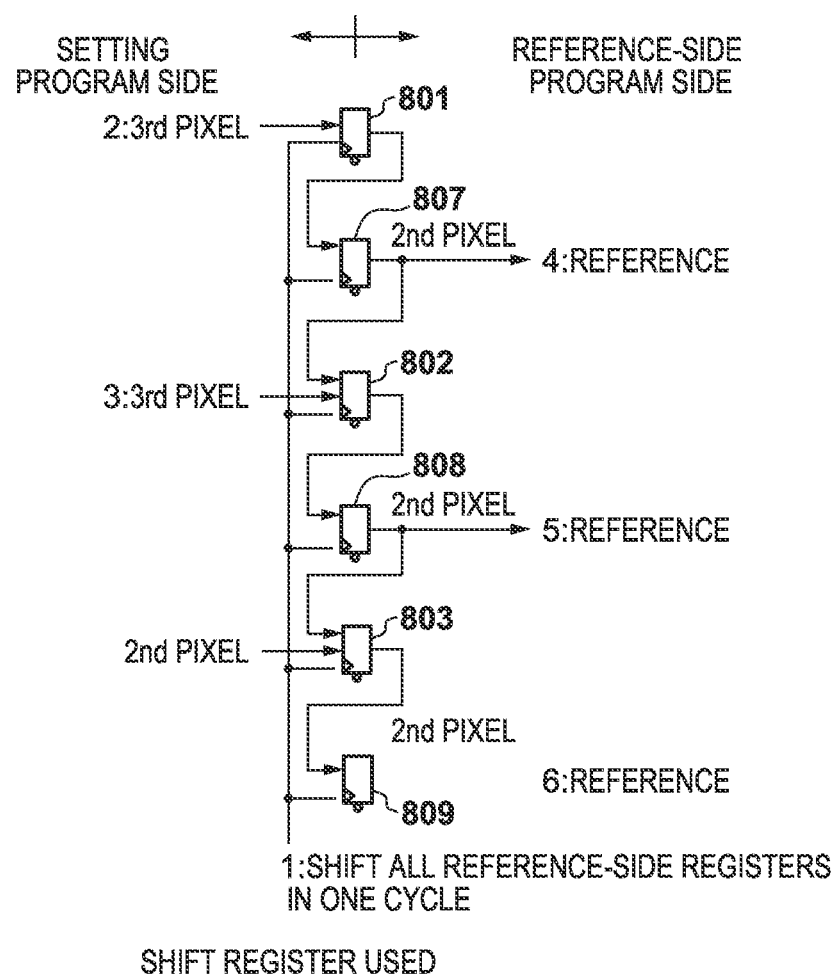

F I G. 13

```
LIST1300

PROCESS1 PROGRAM
00: ADD  R06,R01,R03
01: ADD  R06,R06,R03
02: ADD  R06,R06,R05
03: ADD  R10,R06,R07
04: ADD  R10,R10,R07
05: ADD  R10,R10,R08
06: SHIFT R1f,R10,R1d
07: END
```

```
                    LIST1600

PROCESS1 PROGRAM
00: SHIFT    R02,R01,R10    (R10:#-23)
01: AND      R02,R02,R11    (R11:#0x000000ff)
02: SUB      R02,R12,R02    (R12:#0x96)
03: AND      R03,R01,R13    (R13:#0x007fffff)
04: OR       R03,R03,R14    (R14:#0x00800000)
05: SHIFT    R03,R03,R02
06: SUB      R04,R15,R03    (R15:#0)
07: AND      R01,R01,R16    (R16:#0x80000000)
09: IF_ZERO  R1F,R03,R04
10: END
```

SIGNAL PROCESSING APPARATUS AND NON-TRANSITORY COMPUTER-READABLE STORAGE MEDIUM

BACKGROUND OF THE INVENTION

Field of the Invention

The present invention relates to a signal processing apparatus and a non-transitory computer-readable storage medium.

Description of the Related Art

Conventionally, there have been programmable signal processing apparatuses (signal processors) that dynamically configure signal processing circuits such as Field-Programmable Gate Arrays (FPGA) or reconfigurable circuits, and that execute programs that sequentially execute instruction sequences as with a DSP.

For example, a method of cascade-connecting DSPs executing different programs to form a multi-stage configuration is disclosed in Japanese Patent No. 4222808 (hereinafter referred to as "Document 1"). Since the programs are different, the time required for processing by each DSP will also differ among the DSPs. Therefore, in order to improve the throughput of the DSPs, a contrivance is required to prevent the operation rate of the DSPs from decreasing due to an effect of BUSY states of the other DSPs that operate cooperatively therewith.

In Japanese Patent Laid-Open No. 2011-89913A (hereinafter referred to as "Document 2"), DSPs that execute different programs are configured to calculate data that they have each read from a memory by way of a Direct Memory Access Controller (DMAC), and then write the calculation result into the memory. Also, Document 2 discloses a method of IPC (inter-process communication) for synchronization between DSPs for realizing a data flow equivalent to a configuration in which DSPs are connected in series, by the above-described configuration.

However, in the conventional technique disclosed in the above-mentioned Document 2, while the operation rate of the DSPs is improved, an interface circuit between the DSPs, a control CPU, a control program thereof, or the like are required, which increases the circuit size of the entire signal processing apparatus.

SUMMARY OF THE INVENTION

The present invention has been made in view of the above problems, and provides a technique for simplifying a structure related to data transfer between program execution units that operate in parallel in a programmable signal processing circuit.

According to an aspect of the invention, there is provided a signal processing apparatus comprising: a CPU; and a programmable signal processing circuit having the following: a plurality of execution circuits each of which has a program memory and executes a program stored in the program memory, wherein the plurality of execution circuits can operate in parallel; a register file used for the plurality of execution circuits, wherein the register file has a plurality of registers serially connected and transfers, in accordance with a shift signal, data held by each of the plurality of registers to a register located downstream; a shift controller that issues the shift signal to the plurality of execution circuits at a timing at which the plurality of execution circuits do not execute the program, wherein the CPU stores, to each program memory of the plurality of execution circuits, a program including instructions to make a register of the register file located upstream of a register that another execution circuit is to reference in order to input data be a storage destination for data of a result by the execution of the program so that the data of the result by the execution of the program by the execution circuit is transferred to the another execution circuit via the register file.

According to the present invention, it is possible to simplify a structure related to data transfer between program execution units that operate in parallel in a programmable signal processing circuit.

Further features of the present invention will become apparent from the following description of exemplary embodiments (with reference to the attached drawings).

BRIEF DESCRIPTION OF THE DRAWINGS

FIG. 6 is view illustrating a list of programs that each execution unit of the programmable signal processor will execute according to an embodiment.

FIG. 7 is a timing chart diagram for describing processing of the programmable signal processor according to the embodiment.

FIGS. 8A to 8C are views for comparing each method related to data transfer.

FIG. 13 is a view illustrating a program list to be executed by the first processing unit of the second embodiment.

DESCRIPTION OF THE EMBODIMENTS

Figure 1:
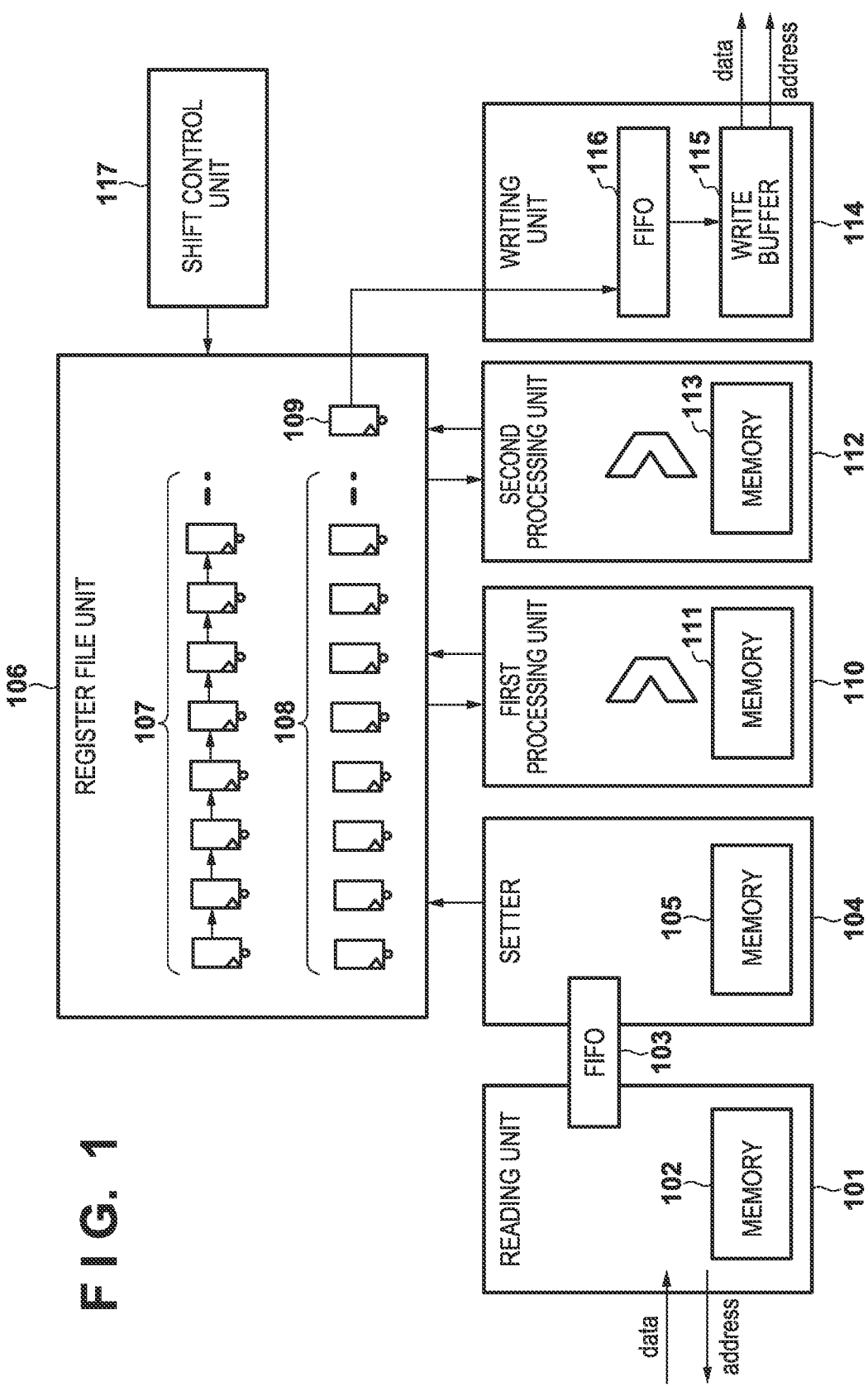
FIG. 1 is a circuit configuration diagram of a programmable signal processor according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

Figure 10:
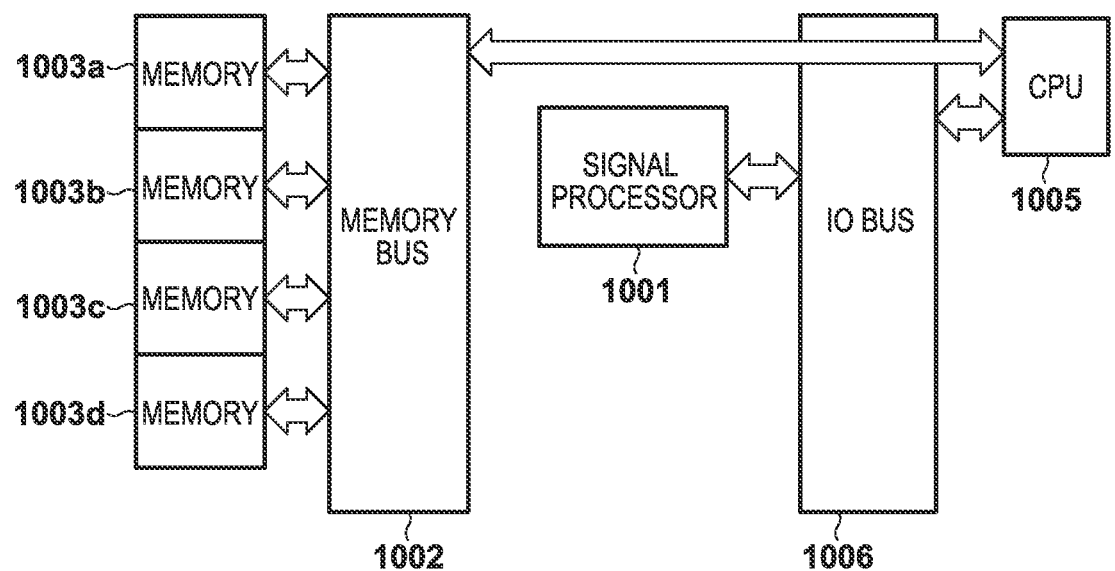
FIG. 10 is a block diagram of an electronic device according to an embodiment.

FIG. 10 illustrates a block diagram of an information processing apparatus according to a first embodiment. For ease of understanding, in the first embodiment, an example in which the information processing apparatus is applied to an image capturing apparatus typified by a digital camera, for example, will be described.

The information processing apparatus of the first embodiment includes a programmable signal processor 1001, a Central Processing Unit (CPU) 1005, memories 1003a to 1003d, a memory bus 1002, and an IO bus 1006. The CPU 1005 manages control of the entire information processing apparatus, and performs control of loading and activating a program to the programmable signal processor 1001. The memories 1003a to 1003d are used to store programs executed by the CPU 1005 and the signal processor 1001, as well as image data to be processed and image data after processing. The memories 1003a to 1003d are configured by a RAM, a ROM, or the like.

The memory bus 1002 is a multi-layer type memory bus that connects a plurality of memories (memory 1003a to 1003d) and a plurality of bus masters (including the illustrated signal processor 1001, a CPU 1005) and transfers data. The IO bus 1006 is an IO bus that connects a plurality of devices and a controller (such as a signal processor 1001, the CPU 1005) and transfers data.

Note, FIG. 10 shows only the main portion according to the present embodiment. For example, in a case where the configuration of FIG. 10 is applied to an image capturing apparatus typified by a digital camera, an image capturing unit for obtaining image data to be processed, a recording unit for recording processed image data in a nonvolatile memory or the like, and a user interface (operation unit, display unit) between the user and the present apparatus are connected to the IO bus 1006 as the above-described device.

The CPU 1005 controls the entire apparatus by executing programs stored in the memories 1003a to 1003d via the memory bus 1002. The CPU 1005 also controls the signal processor 1001 through the IO bus 1006. Specifically, the CPU 1005 reads a plurality of programs executed by the signal processor 1001 from the memories 1003a to 1003d. The CPU 1005 writes the read programs to a plurality of memories (reference numerals 102, 150, 111, and 113 to be described later) built into the signal processor 1001 via IO bus 1006, instructs the signal processor 1001 to activate, and executes processing.

Upon receiving an instruction to activate from the CPU 1001 via the IO bus 1006, the signal processor 1001 reads the image data to be processed stored in the memories 1003a to 1003d, executes filter processing, and writes the filter-processed image data into the memories 1003a to 1003d.

Next, the configuration of the signal processor 1001 according to the embodiment will be described in more detail. FIG. 1 is a circuit configuration diagram of the signal processor 1001 according to the embodiment.

As illustrated, the signal processor 1001 includes a reading unit 101, a setter 104, a first processing unit 110, a second processing unit 112, a writing unit 114, a register file unit 106, and a shift control unit 117. Each of the reading unit 101, the setter 104, the first processing unit 110, and the second processing unit 112 incorporates a memory for holding a program to be executed by itself. Reference numerals 102, 105, 111, and 113 of the illustration are these memories. As described above, the CPU 1005 stores programs (four programs) for the signal processor 1001 read from the memories 1003a to 1003d into the memories 103, 105, 111, and 113, respectively, via the IO bus 1006. The CPU 1005 also performs processing for setting a required value for the signal processor 1001 in a control register held by the signal processor 1001.

The register file unit 106 is configured by a general-purpose shift register group 107, a general-purpose register group 108, and an output register 109. Each of the setter 104, the first processing unit 110, the second processing unit 112, and the writing unit 114 can directly use each register within the register file unit 106.

The general-purpose shift register group 107 is configured by a plurality of shift registers connected in series. Each shift register can hold 32 bits of data. Then, in response to a shift cycle signal from the shift control unit 117, each shift register transfers the data held by itself to a shift register one downstream (details will be described later). Note, although there is no particular limitation on the number of shift registers constituting the general-purpose shift register group 107 in the embodiment, it is assumed that the configuration is made with 16 shift registers in the embodiment. When expressed by operands in a program executed by the signal processor 1001, these serially connected shift registers are denoted by R00, R01, R02, . . . , R0e, and R0f from the most upstream to the downstream (the two characters on the right are expressed in hexadecimal).

The general-purpose register group 108 is configured by a plurality of registers. Although there is no particular limitation on the number of registers, the number of registers is 15 in the embodiment. When expressed by operands in a program, the registers constituting the general-purpose register 108 are denoted by R10, R11, R12, . . . , and R1e. Unlike the shift registers within the general-purpose shift register 107, these registers hold data (32 bits) independently of a shift cycle signal.

The output register 109 is a register for holding filter-processed data (32 bits). It is assumed that the output register 109 is expressed as "R1f" in operand notation.

As described above, the register file unit 106 in the embodiment has a total of 32 registers.

The reading unit 101 reads image data to be processed within the memories 1003a to 1003d in units of pixels by executing a program stored in the program memory 102 internally, and then stores the image data into the memory 103, which is a First In First Out (FIFO) memory. As described above, since processing of the reading unit 101 is a relatively simple process of reading the image data from a specified address and storing the image data into the FIFO memory 103, a program expressing a process of updating the read address is stored in the program memory 102. Note, in a case where there is free space in the FIFO memory 103, the reading unit 101 executes read processing. Also, in a case where the FIFO memory 103 is in a memory full state in which there is no free space, the reading unit 101 temporarily stops reading and waits for free space to be generated.

The setter 104, by executing a program stored in the program memory 105, performs processing for inputting image data from the FIFO memory 103 and setting (or assigning) the image data to a corresponding register in the register file unit 106. That is, the program memory 105 stores a program indicating to which register the input image data is to be set. Note that when the setter 104 inputs data from the FIFO memory 103, a free space for one data unit is generated in FIFO memory 103.

The first processing unit 110 executes a program stored in the program memory 111. The first processing unit 110 performs processing using registers in the register file unit 106 when performing various calculation processing according to the program.

The second processing unit 112 executes a program stored in the program memory 112. The second processing unit 112 performs processing using registers in the register file unit 106 when performing various calculation processing according to the program. Also, the second processing unit 112 stores the image data of the final filter processing result into the output register 109 (shift register "R1f" in the program).

The writing unit 114 stores data held in the output register 109 within the register file unit 106 into a write FIFO memory 116. Then, the writing unit 114 sets the data stored in the FIFO memory 116 in a write buffer 115. The writing unit 114 reads data from the buffer 115 and writes the data to preset addresses of the memories 1003a to 1003d.

The configuration of the signal processor 1001 according to the embodiment has been described above. The FIFO memory 103 is interposed between the reading unit 101 and the setter 104 to absorb differences in processing timings therebetween. Note, it is assumed that the FIFO memory 103 has a capacity capable of storing three pixels worth of image data.

On the other hand, there is no interface circuit for inputting and outputting data between the setter 104, the first processing unit 110, and the second processing unit 112. Instead, the general-purpose shift register group 107 in the register file unit 106 plays a role of transferring data between the setter 104, the first processing unit 110, and the second processing unit 112 (details will be described later).

Figure 2:
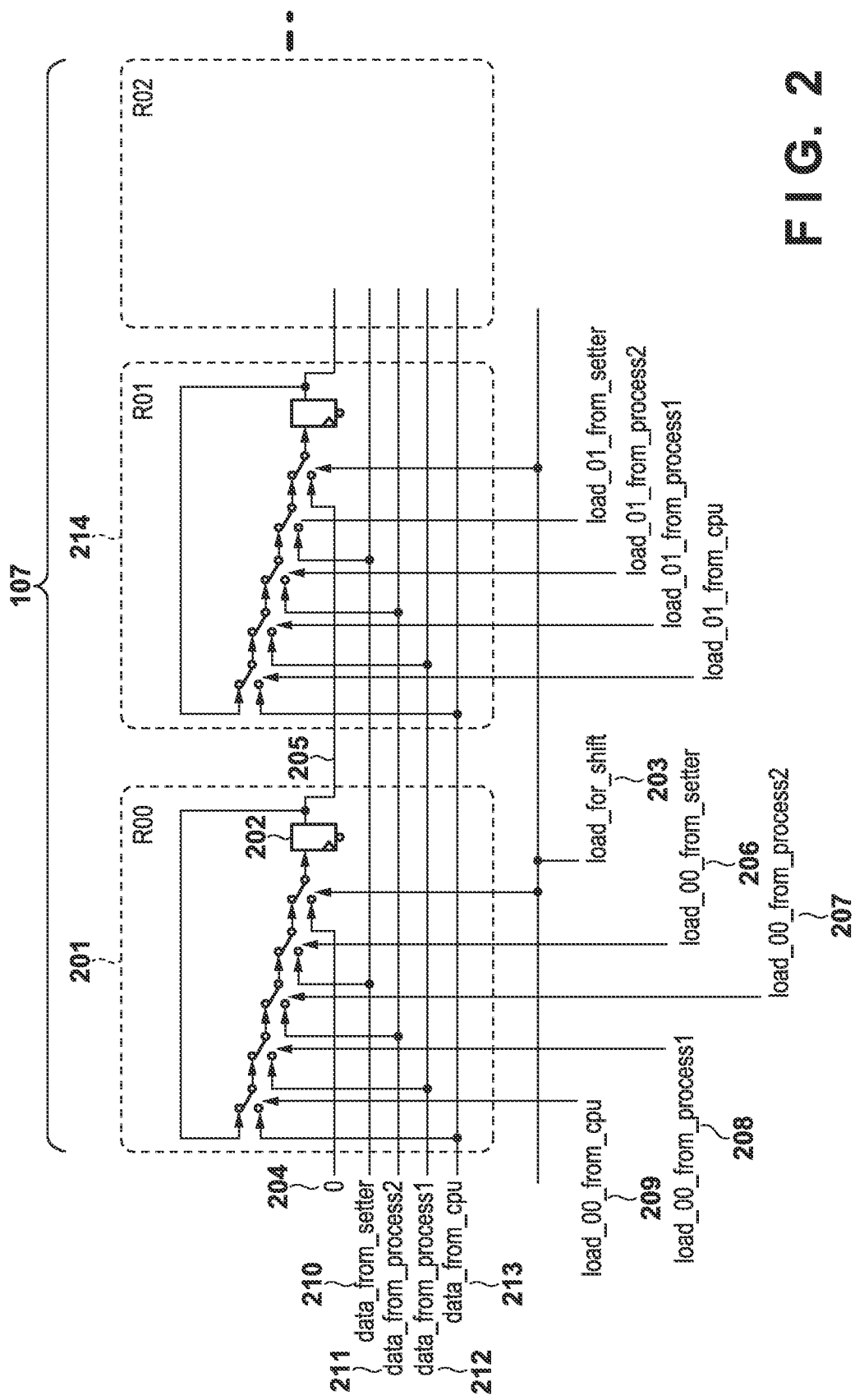
FIG. 2 is a circuit configuration diagram of a shift register group in a register file unit in an embodiment.

FIG. 2 shows a circuit diagram of the general-purpose shift register group 107 in the register file unit 106.

Reference numeral 201 denotes a shift register located most upstream in the serial connection, which is "R00" when indicated by an operand. Reference numeral 214 denotes a shift register located at the second most upstream position of the serial connection, which is "R01" when indicated by an operand. Thereafter, the operands of the registers serially connected will continue with R02, R03, . . ., and R0f. Each register has the same structure.

Here, the shift register 201 will be described. Reference numeral 202 denotes one of the flip-flops holding 32 bits of data. Reference numeral 204 denotes an input signal for transferring data at a time of a shift operation, but 0 is inputted as the input signal since the shift register 201 serves as a register at the head of the shift operation. Note, the number of bits held by the shift register 201 is not particularly limited, and may be 8 bits.

Reference numeral 205 denotes an output of the flip-flop 202, and during a shift operation, the output 205 is loaded into the shift register 214 located downstream.

Reference numeral 210 denotes an input signal from the setter 104, reference numeral 211 denotes an input signal from the second processing unit 112, reference numeral 212 denotes an input signal from the first processing unit 110, and reference numeral 213 denotes an input signal from the CPU 1005 outside of the signal processor 1001.

Reference numeral 203 denotes a signal for loading data into the flip-flop 202 and the other flip-flops in the shift register at the time of a shift operation. Reference numeral 206 denotes a signal that is outputted when the setter 104 writes the input signal 210 to the flip-flop 202. Reference numeral 207 denotes a signal that is outputted when the second processing unit 112 writes the input signal 211 to the flip-flop 202. Reference numeral 208 denotes a signal that is outputted when the first processing unit 110 writes the input signal 212 to the flip-flop 202. Reference numeral 209 denotes a signal that is outputted when the external CPU 1005 writes the input signal 213 to the flip-flop 202.

In a case where each of the reference signals 203, 206, 207, 208, and 209 is active, a switch controlled by each reference signal is connected to the lower side in the figure and outputs each input signal 210, 211, 212, and 213 to the flip-flop 202. Also, as can be seen from the figure, in a case where a load signal of each of the reference signals 203, 206, 207, 208, and 209 is not active, the switch controlled by each reference signal is connected to the upper side in the figure. In a case where each of the reference signals 203, 206, 207, 208 and 209 is not active, the value of the flip-flop 202 returns to the flip-flop 202 again, so that the value of the flip-flop 202 is held even if a clock is supplied.

In addition, there is no circuit for arbitrating load processing of data by each of the reference signals 203, 206, 207, 208 and 209. Therefore, in a case where a plurality of reference signals become active at the same time, the data selected by the switch closest to the flip-flop 202 is loaded into the flip-flop 202. However, in the embodiment, a plurality of processing units are configured so as to not write to one shift register simultaneously.

In this way, the setter 104, the first processing unit 110, and the second processing unit 112 in addition to the CPU 1005 can set to and can also reference (read) the shift register 201.

For example, the setter 104 can set (write) data from the FIFO memory 103 to the register 201 by outputting the data to be written to a signal line 210 and then activating the signal 206 for writing. Further, a first signal processing unit outputs the data to be written to the signal 212 and then activates the signal 208, so that the first signal processing unit can write the data to the register 201.

Figure 3:
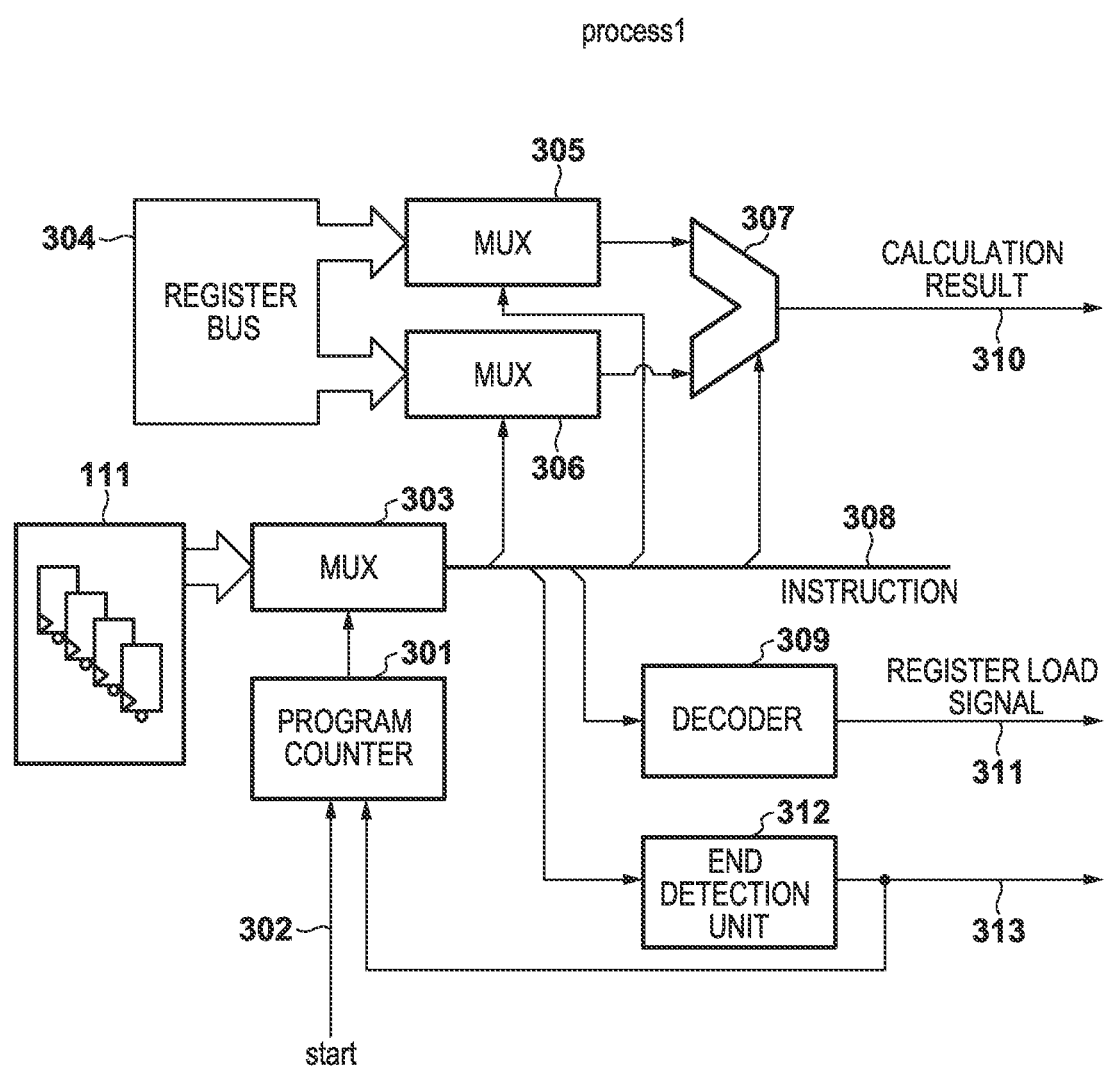
FIG. 3 is a circuit configuration diagram of a first processing unit in an embodiment.

FIG. 3 is an internal block diagram of the first processing unit 110. Reference numeral 301 denotes a program counter indicating an instruction position to be executed by a program in the program memory 111. Reference numeral 303 denotes an instruction selection multiplexer for retrieving an instruction at a position indicated by the program counter 301 in the program memory 111. Reference numeral 304 denotes a register bus which bundles the output signals of all the flip-flops of the register file unit 106. Reference numeral 305 denotes a multiplexer that selects a signal of a first source, which is an input signal to be calculated, from the register bus 304. Reference numeral 306 denotes a multiplexer that selects a signal of a second source, which is an input signal to be calculated, from the register bus 304. Reference numeral 307 denotes an Arithmetic and Logic Unit (ALU) that performs a calculation according to an execution instruction 308 on the two values of the first source and the second source. Reference numeral 310 denotes a calculation result from the ALU 307. Reference numeral 309 is a binary decoder that activates a load signal 311 to any register of the register file unit 106 in accordance with the execution instruction 308. Reference numeral 312 denotes an END detection unit which detects an instruction "END" indicating the end of storage in the program memory 111. The END detection unit 312 outputs a signal 313 in a case where an END instruction is detected. The program counter 301 stops updating the program counter (address) in response to the signal 313, and sets the value to the head of the program. The END detection unit 312 also outputs the signal 313 to the shift control unit 117.

The structure of the first processing unit 110 has been described above. The second processing unit 112 has the same structure as that of the first processing unit 110, and description thereof will be omitted. Also, the setter 104 has a program counter and an END detection unit, and when the END detection unit detects an END instruction, the address updating is stopped and the value is set to the head of the program.

The shift control unit 117 may receive a detection signal of an END instruction from each of the setter 104, the first processing unit 110, and the second processing unit 112. In a case where the shift control unit 117 receives the detection signal of the END instruction from all of the setter 104, the first processing unit 110, and the second processing unit 112, it activates the signal 203 (with reference to FIG. 2) and issues a shift cycle signal. As a result, each shift register constituting the general-purpose shift register group 107 transfers data to a shift register one downstream. In response to the shift cycle signal, the setter 104, the first processing unit 110, and the second processing unit 112 start processing for the next cycle.

Figure 4A:
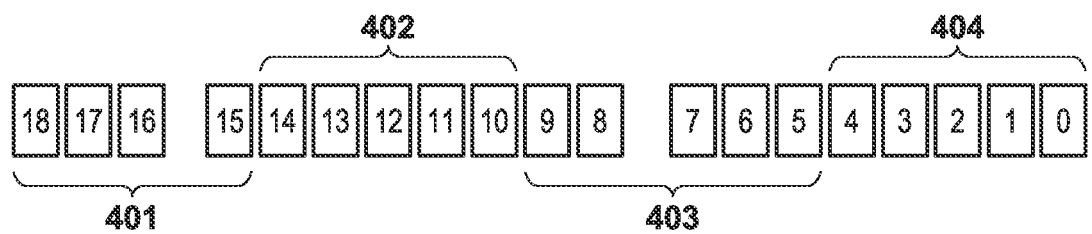
FIGS. 4A and 4B are views illustrating bit assignments of instructions executed by a first processing unit according to an embodiment.
Figure 4B:
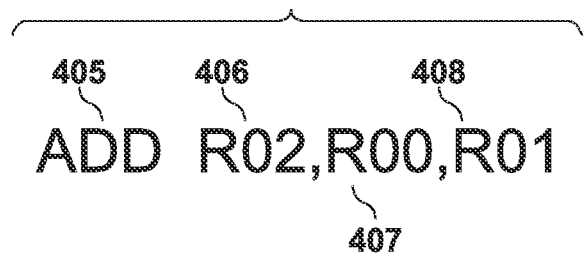

FIGS. 4A and 4B show a program instruction stored in the memory 111 of the first processing unit 110 (or the memory 113 of the second processing unit).

The FIG. 4A illustrates the roles of bits in a 19-bit instruction. The instruction consists of four fields. The 4 bits of bits 18 to 15 are an opcode field 401 indicating the type of calculation (addition, subtraction, logical operation, etc.), that is, an operator. The 5 bits of bits 14 to 10 are a destination field 402 indicating the storage destination for storing the calculation result. The 5 bits from bit 9 to bit 5 are a second source field 403 indicating the second source. Also, the 5 bits from bit 4 to bit 0 are a first source field 404 indicating the first source. In this way, a role is determined for each bit in the instruction.

FIG. 4B shows an exemplary mnemonic notation on the assembler of these instructions.

Reference numeral 405 denotes an opcode indicating "addition", reference numeral 406 denotes a setting destination register, and reference numerals 407 and 408 denote reference registers. The opcode 405 corresponds to the opcode field 401 and the setting destination register 406 corresponds to the destination field 402 of FIG. 4A. The reference register 407 corresponds to the second source field 403, and the reference register 408 corresponds to the first source field 404.

An operation performed in a case where the first processing unit 110 executes the instruction shown in FIG. 4B is as follows. The first processing unit 110 causes the multiplexer 305 to select the shift register R00 in the register file unit 106 and then causes the multiplexer 306 to select the shift register R01. Then, the ALU 307 adds values selected by the multiplexer 305 and 306 (the values read from each of the shift registers R00 and R01) in accordance with the execution instruction 308 (the opcode "ADD" in FIG. 4B), and then outputs the calculation result 310. At this time, the decoder 309 selects the shift register "R02" in the destination field 402 and then activates the signal 208. As a result, the result of adding the two values held in the shift register R00 and R01 is written to the shift register R02.

Figure 9:
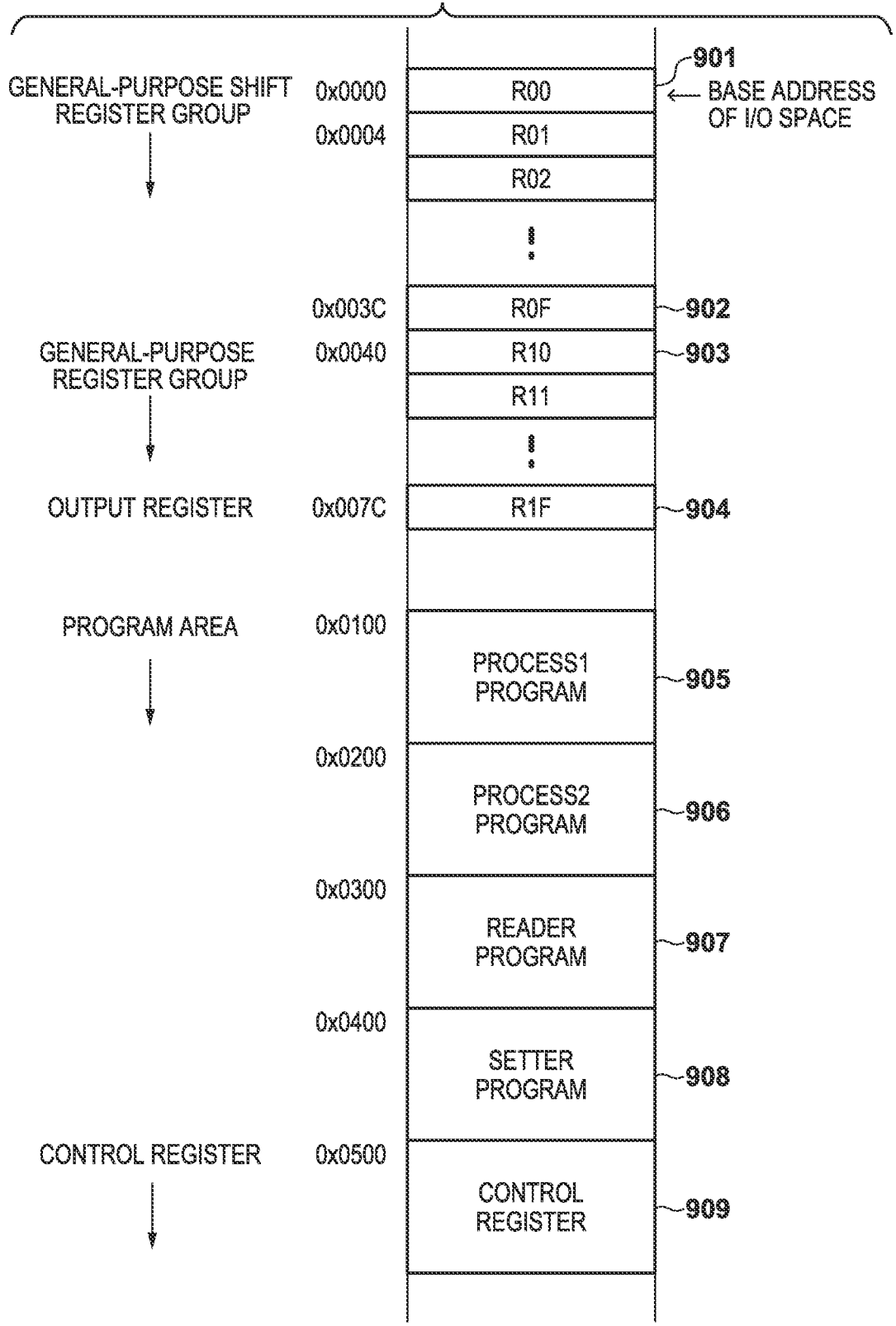
FIG. 9 is a view illustrating a memory map of an IO bus according to an embodiment.

FIG. 9 shows the memory space of the IO bus 1006 of the signal processor 1001 in the embodiment.

The data bus of the IO bus 1006 is 32-bit and is readable and writable from the CPU 1005. The shift registers R00, R01, and . . . constituting the general-purpose shift register group 107 are allocated from a base address 0x0000 indicated by reference numeral 901 to an address 0x003C indicated by reference numeral 902 (an address starting with "0x" is represented in hexadecimal notation). Also, the registers R10, R11, and . . . constituting the general-purpose register group 108 are allocated from an address 0x0040 indicated by reference numeral 903. Further, the output register 109 is allocated to an address 0x007C indicated by reference numeral 904.

Addresses 0x0100 to 0x01ff indicated by reference numeral 905 are allocated to the memory 111 of the first processing unit 110. Addresses 0x0200 to 0x02ff indicated by reference numeral 906 are allocated to the memory 113 of the second processing unit 112. Addresses 0x0300 to 0x03ff indicated by reference numeral 907 are allocated to the memory 102 of the reading unit 101. Addresses 0x0400 to 0x04ff indicated by reference numeral 908 are allocated to the memory 105 of the setter 104. Also, reference numeral 909 is allocated to a control register of the signal processor 1001. The control register includes, for example, a register describing a timing at which a series of processing ends. For example, the signal processor 1001 can be set so as to stop in a case where a processing result corresponding to a predetermined number of pixels in the horizontal direction has been obtained.

As understood from FIG. 9, the memories storing each register in the register file unit 106 and programs that each program execution unit including the reading unit 101, the setter 104, the first processing unit 110, the second processing unit 112, and the writing unit 114 have are mapped to different regions in the memory space of the IO bus 1006. Therefore, the CPU 1005 can freely access the memories of each register in the register file unit 106 and each program execution unit. For example, in a case where the CPU 1005 writes a program of the reading unit 101 in the signal processor 1001, the program may be written from the position of the address 0x0300. In addition, the CPU 1005 can also write an arbitrary value to an arbitrary register of the register file unit 106 by specifying the corresponding address.

The signal processor 1001 has the memories 102, 105, 111, and 113 that are SRAM which can be accessed at high speed. SRAM is more quickly accessible than DRAM, but is more costly per capacity than DRAM. Since each of the memories 102, 105, 111, and 113 stores a relatively small program, the capacity of each memory can be reduced. Therefore, in the embodiment, SRAM is adopted as the memories 102, 105, 111, and 113, and a program can be read and written at high speed while reducing an increase in cost. Note that the memories 102, 105, 111, and 113 may be configured by flip-flops.

Figure 11:
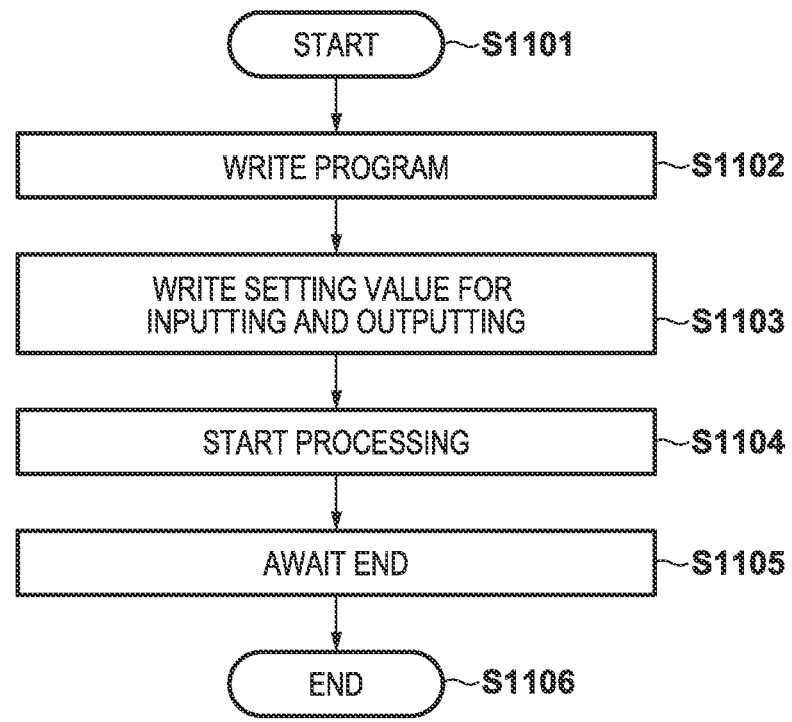
FIG. 11 is a flowchart illustrating a processing sequence of a CPU of an embodiment.

FIG. 11 shows a processing sequence related to an activation of the signal processor 1001 among programs executed by the CPU 1005.

In step S1101, the CPU 1005 starts the processing.

In step S1102, the CPU 1005 reads, from the memories 1003a to 1003d via the memory bus 1002, programs (four in the embodiment) to be executed by the reading unit 101, the setter 104, the first processing unit 110, and the second processing unit 112, respectively, in the signal processor 1001. Then, The CPU 1005 writes, according to the memory map of FIG. 9 described previously, the program to be executed by the reading unit 101 with 0x0300 as the head address in the IO address space. That is, the CPU 1005 stores the program executed by the reading unit 101 in the memory 102. Similarly, the CPU 1005 writes the program for the setter 104 into the memory 105. Also, the CPU 1005 writes the program for the first processing unit 110 into the memory 111. Further, the CPU 1005 writes the program for the second processing unit 112 into the memory 113. The CPU 1005 also writes various types of data into control registers and general-purpose registers of the signal processor 1001 as needed.

In step S1103, the CPU 1005 sets the head address of the image data in the address space of the memory bus 1002 to the reading unit 101, and also sets the head address at a time of writing the filter-processed pixel data to the writing unit 114.

In step S1104, the CPU 1005 instructs the signal processor 1001 to activate and starts the processing.

Then, the CPU 1005 waits for an interrupt signal indicating the end of the processing from the signal processor 1001 in step S1105. In a case where the CPU 1005 receives the interrupt signal indicating the end of the processing, the processing ends in step S1106.

Once the CPU 1005 starts the process of the signal processor 1001 in this way, the end thereof need only be waited for since it is not necessary adjust the synchronization in the internal parallel operation. Note that the CPU 1005 may perform other processing while waiting.

Figure 5:
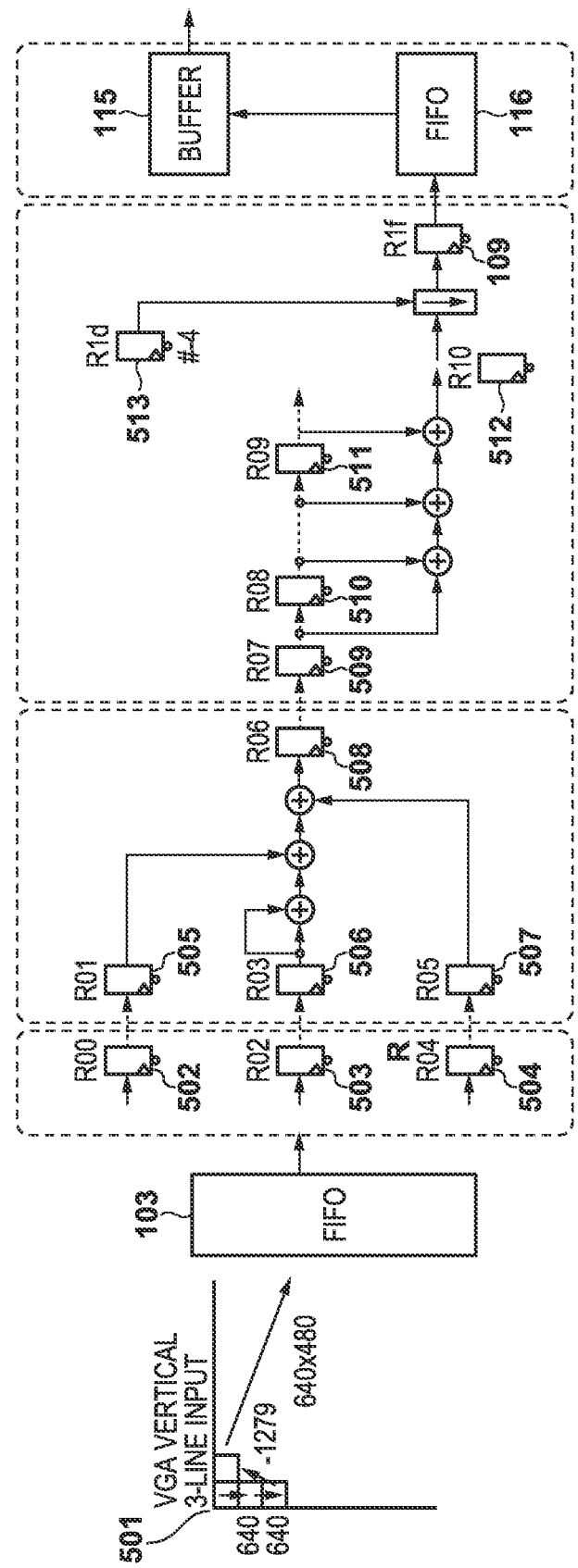
FIG. 5 is an equivalent circuit diagram of a time when each execution unit of a programmable signal processor executes a program according to an embodiment.

FIG. 6 shows an example of a program executed by the signal processor 1001. Also, FIG. 5 shows an equivalent circuit diagram when the signal processor 1001 executes the program shown in FIG. 6.

Further, it is assumed that for the image 501 to be processed in the embodiment, one screen is configured by 640 pixels in the horizontal direction and 480 pixels in the vertical direction, and one pixel is represented by 32 bits. Normally, image data is often represented by 8 bits, but in this case, the image data may be processed by using 8 bits out of 32 bits. It is assumed that the data of each pixel constituting the image data to be processed are stored in order in a raster scan order from a predetermined address in the address space in the memory bus 1002.

A LIST 601 of FIG. 6 shows a program stored in the memory 102 of the reading unit 101. A LIST 602 shows a program stored in the memory 105 of the setter 104. A LIST 603 shows a program stored in the memory 111 of the first processing unit 110. Also, a LIST 604 shows a program stored in the memory 113 of the second processing unit 112.

The reading unit 101 reads the image data from the head address position set by the CPU 1005, and then stores the read image data into the FIFO memory 103. Then, the reading unit 101 performs processing of adding the value indicated by the program LIST 601 to the previously used address, updates the read address, reads the image data from the address position after the update, and then stores the read address in the FIFO memory 103. Hereinafter, the processing of updating addresses and storing image data into the FIFO memory 103 is performed until the FIFO memory 103 is in a memory full state. Free space in the FIFO memory 103 is generated when the setter 104 located downstream performs a process of obtaining data from the FIFO memory 103.

As described above, in the embodiment, the image data are stored in a raster scanning order from the predetermined address positions in the memories 1003a to 1003d. The size of the image data is 640 pixels in the horizontal direction. Therefore, the reading unit 101 will update the readout address by adding 640, 640, and −1279 offsets in order to the initial address, as shown in the LIST 601. Therefore, when the processing is started, the reading unit 101 first reads out three vertically aligned pixels including the pixels in the upper left corner of the image data and then stores the three vertically aligned pixels into the FIFO memory 103. Next, the reading unit 101 reads out the data of three pixels in the vertical direction at a position shifted by one pixel in the horizontal rightward direction, and then stores the data into the FIFO memory 103. Thereafter, the reading unit 101 repeats this processing.

The setter 104 inputs image data from the FIFO memory 103 and then stores the image data into a shift register specified by a program shown in the LIST 602. It should be understood that "LOAD R00" in the LIST 602 is an instruction to "load (store) the image data read from the FIFO memory 103 into the (shift) register R00". In other words, the setter 104 performs processing of storing the uppermost pixel data of the three vertically aligned pixels into the shift register R00, the middle pixel data into the shift register R02, and the lowermost pixel data into the shift register R04. Then, since step 03 in the LIST 602 is "END", the setter 104 stops the program counter, returns the program counter to the address of the head of the program, and then waits for a shift cycle signal to be issued. By continuing the above processing, the setter 104 performs input until the right end of the image while maintaining a relationship of three pixels in the vertical direction. Note that when the image data is read from the FIFO memory 103 by the setter 104, free space is generated in the FIFO memory 103. Therefore, when the FIFO memory 103 is in a memory full state and the reading unit 101 has stopped reading, the reading unit 101 resumes the read processing of subsequent image data when the setter 104 has read the image data from the FIFO memory 103.

Here, when the shift control unit 117 issues a shift cycle signal indicating a shift timing to the general-purpose shift register group 107, the general-purpose register file unit 106 transfers the data held by each of the shift registers constituting the general-purpose shift register group 107 to a shift register located one downstream.

The first processing unit 110 performs processing according to the program shown in the LIST 603. It should be understood that the program "ADD R06, R01, R03" is an instruction that "adds the values of the shift registers R01 and R03 and stores the result of the addition into the shift register R06." Immediately before the first processing unit 110 starts the processing according to the program shown in the LIST 603, when the shift control unit 117 issues a shift cycle signal, the pixel data held in the shift register R00 is transferred to R01, the pixel data held in the shift register R02 is transferred to R03, and the pixel data held in the shift register R04 is transferred to R05. That is, the data of the three pixels in the vertical direction stored in the shift registers R00, R02, and R04 by the reading unit 101 are transferred to the shift registers R01, R03, and R05. In addition, the first processing unit 110 re-executes the program from the head the LIST 603 in accordance with a reception of the shift cycle signal. When steps 00 to 02 in the LIST 603 are executed, a value of P1+2×P2+P3 is stored into the shift register R06 when the values of three pixels from the top to the bottom in the vertical direction are taken as P1, P2, and P3.

Since step 03 of the LIST 603 is "END", the first processing unit 110 returns the processing to the head and waits for the shift cycle signal to be issued.

The second processing unit 112 performs processing according to the program shown in the LIST 604. It should be understood that "SHIFT R1f, R10, R1d" in step 03 of the LIST 604 is an instruction to "shift the value of the register R10 by the number of bits indicated by the value stored in the register R1d and store the shift result in the register R1f". The bit shift direction depends on the value of the third operand R1*d*, and is a left shift (shift toward higher bits) in the case of positive and a right shift (shift toward lower bits) in the case of negative.

In the embodiment, the CPU 1005 stores the program of the LIST 604 in the memory 113 of the second processing unit 112 and sets a value "−4" to the shift register R1*e*. In other words, since the instruction for storing "−4" in the register R1*e* is not required be described in the LIST 604, the program-size can be reduced and the processing-throughput can be improved.

When the shift control unit 117 issues the shift cycle signal immediately before the second processing unit 112 starts the processing according to the program shown in the LIST 604, the value stored in the shift register R06 by the first processing unit 110 in the immediately preceding cycle is transferred to the shift register R07. Also, the shift register R08 stores the value stored in the shift register R06 by the first processing unit 110 two cycles earlier. Further, the shift register R09 stores the value stored in the shift register R06 by the first processing unit 110 three cycles earlier.

Therefore, when the second processing unit 112 executes steps 00 to 02 of the LIST 604, a value P1+2×P2+P3 is stored in the shift register R10 when the three pixels in the horizontal direction are P1, P2, and P3. For the first processing unit 110 a calculation for three pixels arranged in the vertical direction is performed. Therefore, when the second processing unit 112 executes the instruction of step 03 of the LIST 604, a value obtained by right-shifting the value of the shift register R10 by 4 bits (equivalent to dividing by 16) is stored in the output register R1*f*. In other words, the filter-processed pixel data at the center position of the 3×3 pixel block is stored into the output register R1*f*. Since step 04 of the LIST 604 is "END", the second processing unit 112 returns the program counter to the head and waits for the next shift cycle signal to be issued.

Here, a synchronization between the reading unit 101, the setter 104, the first processing unit 110, and the second processing unit 112 in the signal processor 1001 will be described with reference to the timing chart of FIG. 7.

Reference numeral 701 indicates a position of a pixel corresponding to the image data read by the reading unit 101 and stored in the FIFO memory 103. 0, 640, 1280 . . . indicate offset addresses of image data rather than the values of the image data.

Reference numeral 702 denotes image data written by the setter 104. R00, R02, and R04 indicate a destination register of the image data, not the value of the image data. One cycle later than the reading unit 101, the setter 104 writes the data of the offset address 0 into the shift register R00, the data of the offset address 640 into the shift register R02, and the data of the offset address 1280 into the shift register R04.

Reference numeral 704 denotes each step executed by the first processing unit 110, and reference numeral 705 denotes each step executed by the second processing unit 112.

Reference numeral 703 denotes a shift cycle signal. The shift control unit 117 issues the shift cycle signal 703 when all the program execution units of the setter 104, the first processing unit 110, and the second processing unit 112 return each of their program counters to the head in their own memories (when an END instruction is detected). As a result, the shift cycle signal is issued at a timing at which the setter 104, the first processing unit 110, and the second processing unit 112 do not execute the program and each of the processing units of the setter 104, the first processing unit 110, and the second processing unit 112 executes the program in its own memory again in accordance with the shift cycle signal.

By this mechanism, the setter 104, the first processing unit 110, and the second processing unit 112 can operate in parallel. In addition, data transfer is possible even if there is no interface circuit for performing data transfer between the setter 104, the first processing unit 110, and the second processing unit 112.

Figure 8A:
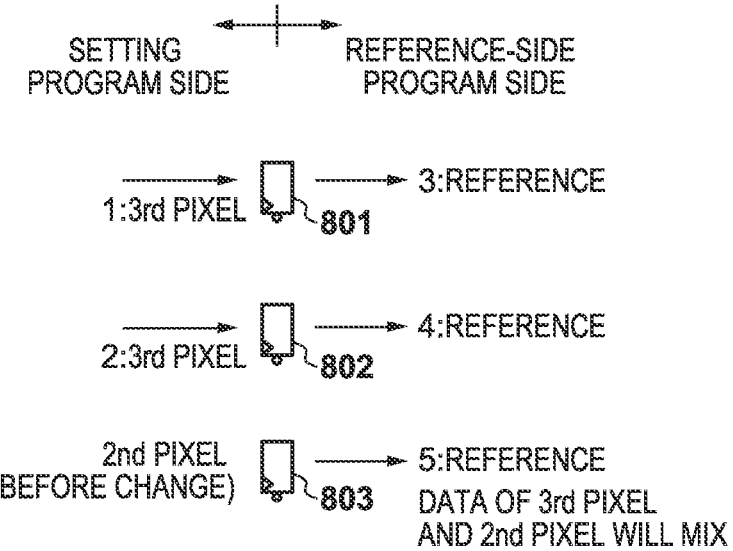

A detailed description will be given with reference to FIGS. 8A to 8C. FIG. 8A is a view for describing a problem in a case where the setting program and the reference program which references set data operate in parallel. For example, in a case where the first processing unit 110 processes the data written in the shift register 107 by the setter 104, the setter 104 is the setting program side, and the first processing unit 110 is the reference program side. In addition, in a case where the second processing unit 112 processes the calculation result of the first processing unit 110, the first processing unit 110 becomes the setting program side, and the second processing unit 112 becomes the reference program side.

When the reference program overtakes the setting side after the setting program sets the third pixel to the registers 801 and 802, the register 803 refers to the information of the second pixel.

Figure 8B:
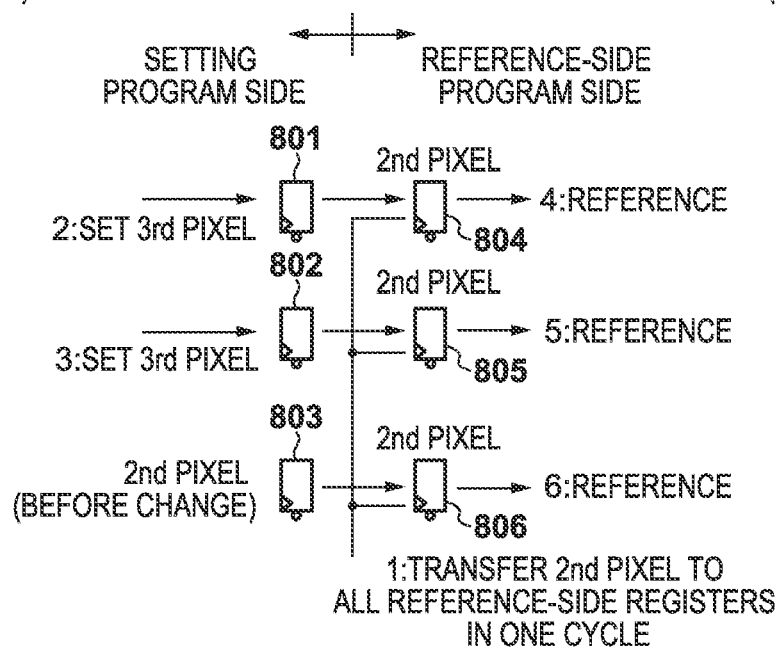

In order to avoid such a situation, only the second pixel can be referenced by the reference program until the setting program finishes setting a third pixel in a configuration in a case where a double buffer method (registers 801 and 804, registers 802 and 805, and registers 803 and 806) is taken, as in FIG. 8B. After the setting program finishes writing the third pixel to the registers 801 to 803 and the reference program finishes referencing the second pixel from the registers 804 to 806, the third pixel is transferred in one cycle.

Although the configuration of FIG. 8B is a common configuration, it requires twice as many flip-flops, resulting in a larger circuit scale.

In the present embodiment, a shift register group is used as shown in FIG. 8C. As a result, when all of the setter 104, the first processing unit 110, and the second processing unit 112 have completed one cycle of processing, the shift control unit 117 issues a shift cycle signal. The general-purpose shift register group 107 is used for calculation, and, depending on the application, it is possible to allocate a large number of interfaces between programs, or conversely, to allocate a large number of interfaces for circuit calculation. Therefore, it is possible to configure a programmable signal processing circuit having a large adaptive range with a small circuit.

Although the first embodiment has been described above, the features thereof are summarized as follows.

The programmable signal processor includes a general-purpose shift register group serially connected, a plurality of program execution units (a setter, a first processing unit, and a second processing unit are representative) that can execute in parallel with each other and use the general-purpose shift register group, and a shift control unit that generates a shift cycle signal for a shift request to the shift registers constituting the general-purpose shift register group and a start request for processing of one cycle in each program execution unit. In such a configuration, in a case where one computer program execution unit passes data to another program execution unit, the data is stored in the shift register one upstream of the shift register used by the other program execution unit for input. Also, in a case where one program execution unit passes a plurality of pieces of data to another program execution unit, data is stored in a plurality of shift registers positioned at intervals, sandwiching at least one shift register therebetween. In addition, in a case where an instruction indicating the end of processing for one cycle is detected, each program execution unit ends the operation and sets the program counter to the initial position in preparation for the next cycle. Then, the shift control unit issues a shift cycle signal in response to the detection of the end instruction of the processing for one cycle from all the program execution units.

Note that the reading unit 101 does not use the general-purpose shift register group 107. Also, the program executed by the reading unit 101 does not include an END instruction. This is because the reading unit 101 stops reading in a case where the FIFO memory 103 is in the memory full state, and only needs to perform reading in a case where the memory is not in the memory full state.

According to the above-described configuration, program execution units that can operate in parallel with each other can transfer data with each other by using a simple configuration called a serially connected shift register group, and can perform a given filter processing.

Second Embodiment

A second embodiment will be described. The apparatus configuration is the same as that in FIG. 10 of the first embodiment, and description thereof will be omitted.

Figure 12:
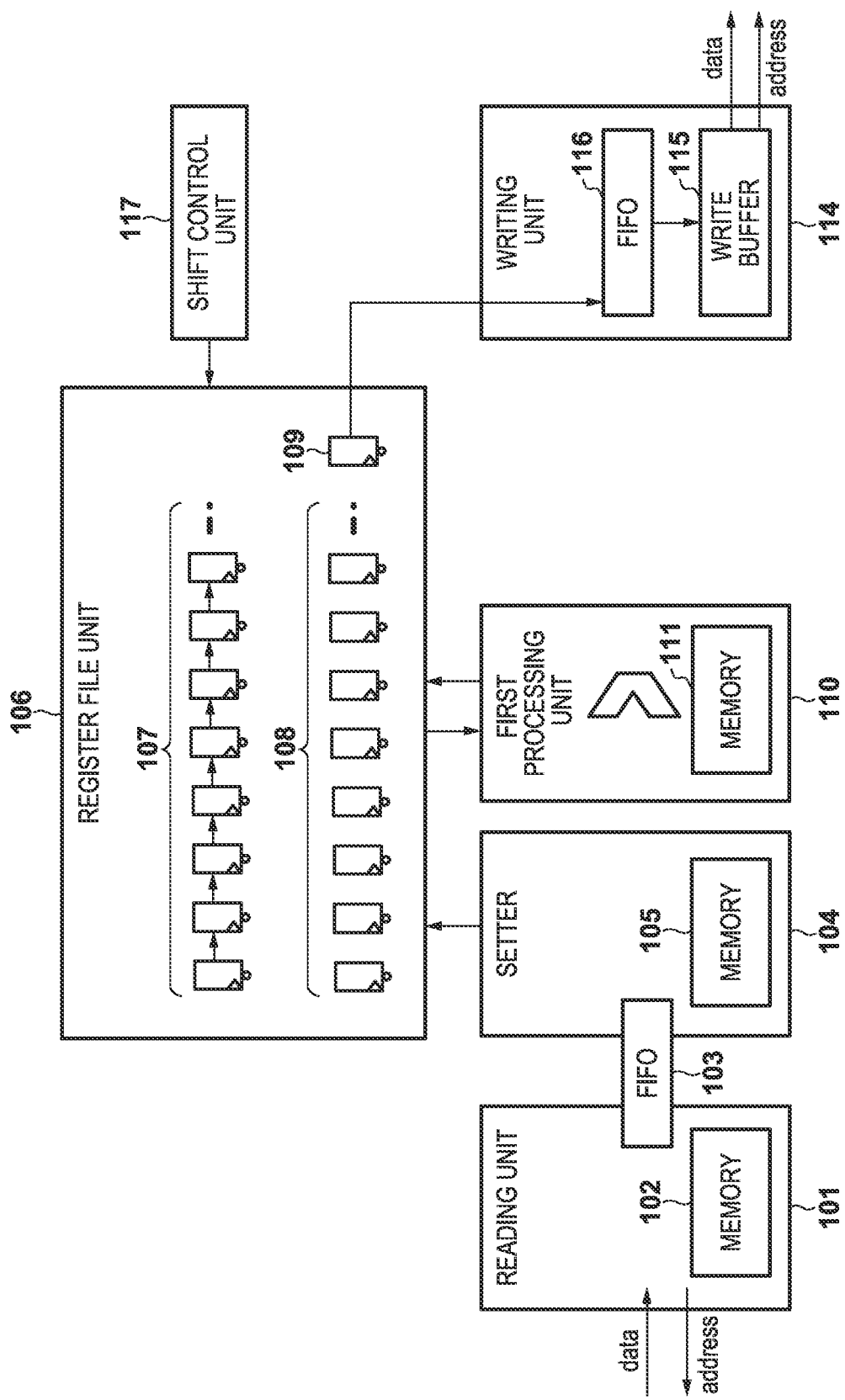
FIG. 12 is a circuit configuration diagram of a programmable signal processor according to a second embodiment.

FIG. 12 is a circuit configuration diagram of a programmable signal processor 1001 according to the second embodiment. The same components as in FIG. 1 are denoted by the same reference numerals.

In the first embodiment, four program execution units—the reading unit 101, the setter 104, the first processing unit 110, and the second processing unit 112—operate in parallel. Generally, the greater the number of program execution units, the more the speed of processing of a signal processor can be improved, but the circuit scale also becomes accordingly more complex. In the second embodiment, there is no program execution unit corresponding to the second processing unit 112, and the number of program execution units operating in parallel is reduced to further simplify the circuit scale. The processes of the reading unit 101, the setter 104, and the writing unit 114 are the same as those in the first embodiment.

FIG. 13 shows a list of a program stored in the memory 111 of the first processing unit 110 according to the second embodiment. Since the first processing unit 110 of the second embodiment also includes and executes the program executed by the second processing unit 112 in the first embodiment, the number of program steps will increase. Since the throughput of the signal processor 1001 depends on the maximum number of program steps executed by the program execution unit, in the case of the configuration of the second embodiment, although the throughput is lower than that of the first embodiment, the circuit scale can be reduced.

Third Embodiment

A third embodiment will be described. The apparatus configuration is the same as that in FIG. 10 of the first embodiment, and the description thereof will be omitted.

Figure 14:
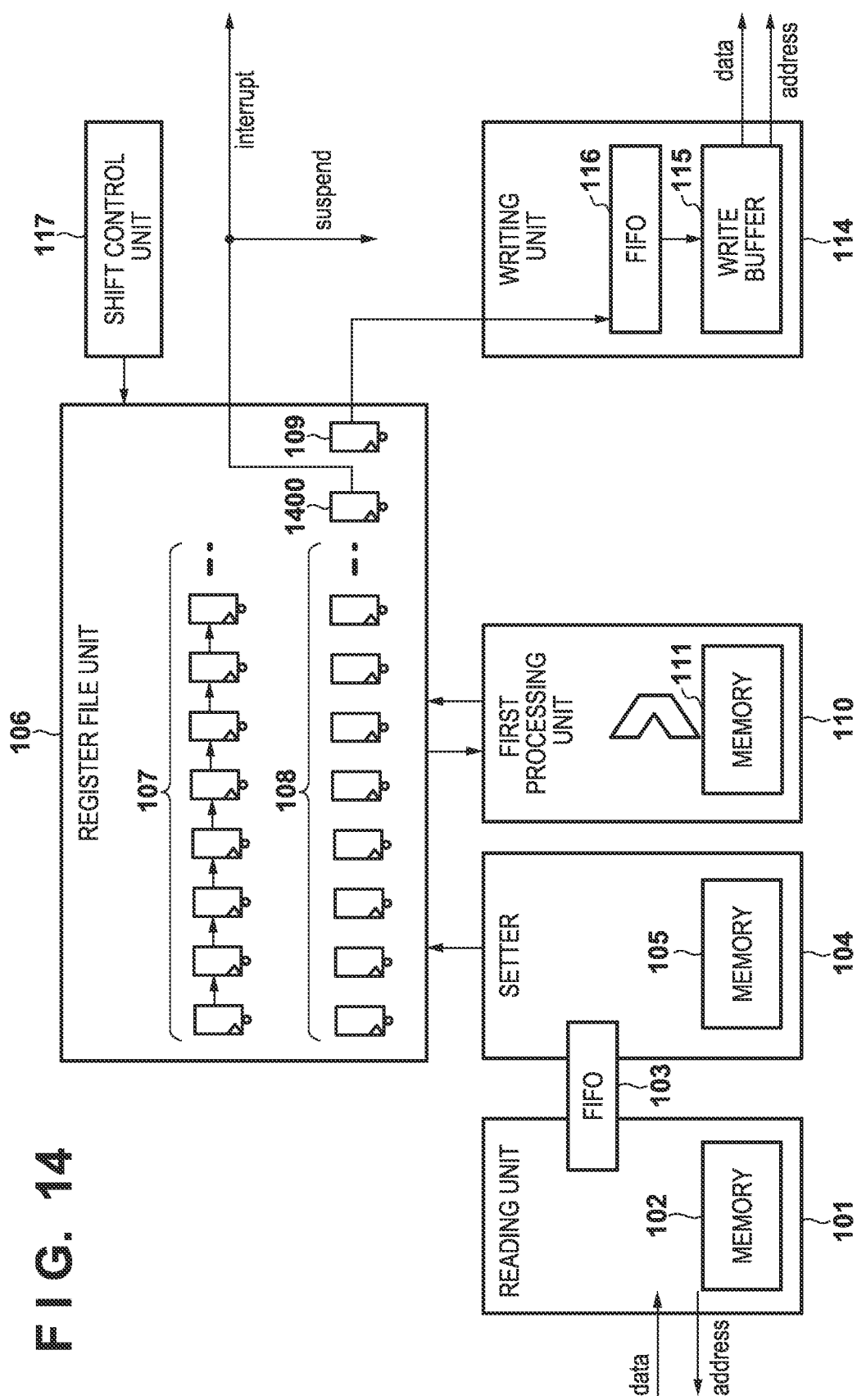
FIG. 14 is a circuit configuration diagram of a programmable signal processor according to a third embodiment.

FIG. 14 is a circuit configuration diagram of a programmable signal processor 1001 according to the third embodiment. The same components as in FIG. 1 are denoted by the same reference numerals.

A feature of the signal processor 1001 in the third embodiment is that an interrupt signal generation register 1400 is added as shown in FIG. 14. Although the interrupt signal generation register 1400 may be newly added, a register R1E which is one of the general-purpose registers 108 is used here. When "1" is written to bit 0 of the register R1E, the signal processor 1001 outputs an interrupt signal to an external unit (e.g., the CPU 1005), causes the signal processor 1001 to transition to a suspended state, and stops until it is caused to resume by a control register from an external unit.

The CPU 1005 performs predetermined interrupt processing by the interrupt signal. The predetermined interrupt processing performed by the CPU 1005 can be complex processing. Therefore, exceptionally complex processing by the signal processor 1001 can be taken over by the CPU 1005, which dramatically increases the fields to which application is possible.

In addition, when the CPU 1005 executes processing that does not include an arithmetic calculation, such as scanning a data string to detect a marker code, the total throughput, including the signal processor 1001, can be improved since there is no overhead such as a loop jump instruction or a counter increment instruction.

Fourth Embodiment

Figures 15, 16:
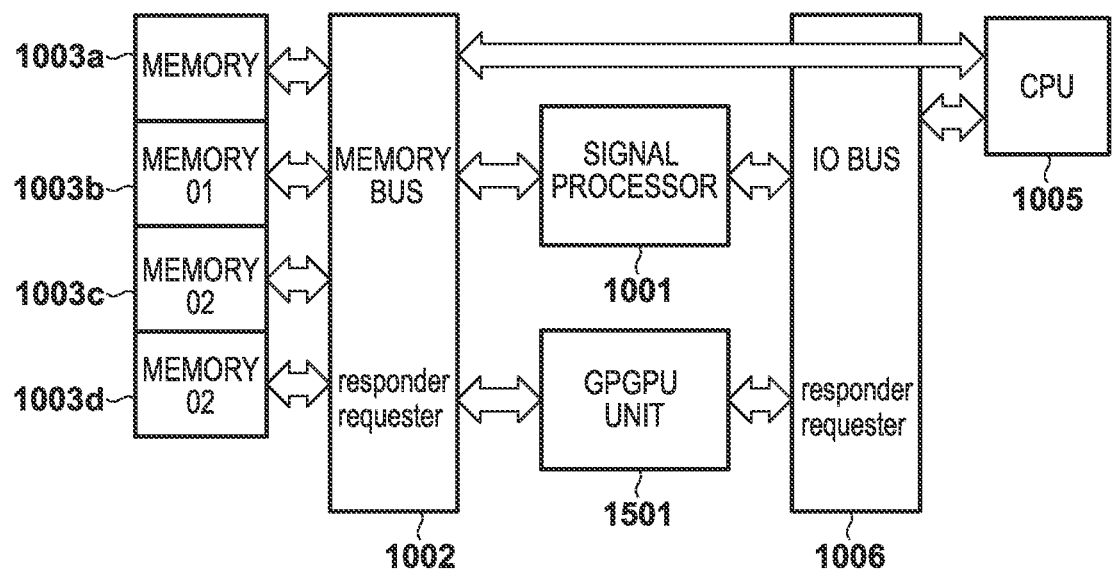
FIG. 15 is a block diagram of an electronic device according to a fourth embodiment.
FIG. 16 is a view illustrating a program list to be executed by the first processing unit of the fourth embodiment.

The fourth embodiment will be described. FIG. 15 is a block diagram of the apparatus in the present fourth embodiment. In FIG. 15, a GPGPU unit (a general-purpose computing on GPU (Graphics Processing Unit)) 1501 is added to the configuration of FIG. 10.

In an image capturing apparatus represented by a digital camera in recent years, autofocus is generally performed using a signal obtained from an image capturing surface. However, there is a problem in that, in order to convert a pupil-separated signal into a defocus amount, characteristics greatly change, depending on the coordinates on the image, which depend on optical characteristics of the sensor and optical characteristics of the lens. Conditions are even more complex in the case of a lens-interchangeable type image capturing apparatus.

Such complex optical calculations use floating point polynomials. In view of this, in the fourth embodiment, the GPGPU unit 1501 obtains a defocus amount conversion coefficient. However, the side using the defocus amount conversion coefficient needs only about 8 bits of integer information, and it is necessary for the data to be processed to reduce the amount of data transferred.

Therefore, in the fourth embodiment, the programmable signal processor 1001 is used for processing a result of a floating-point calculation.

Figure 17:
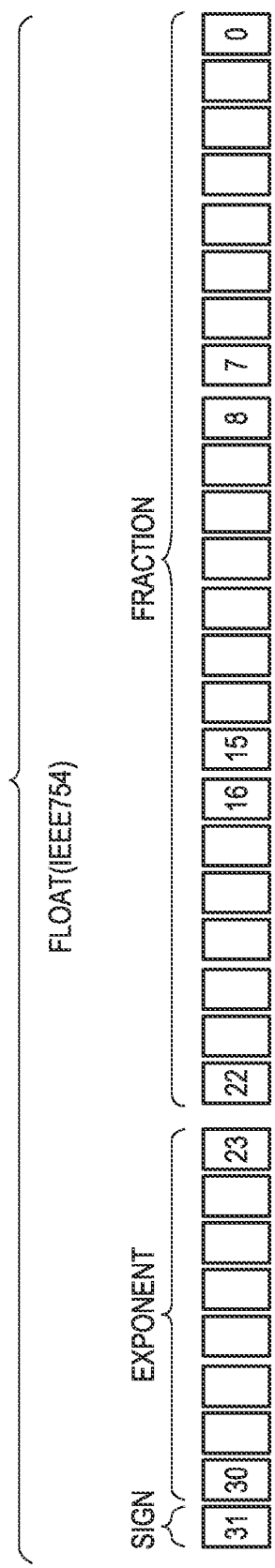
FIG. 17 is a view illustrating bit assignments of floating point data according to the fourth embodiment.

FIG. 17 shows a bit assignment of floating points. Bits are assigned to a sign part (positive or negative sign), an exponent part, and a mantissa part, respectively, and it is difficult to perform an auto-focus calculation at high speed as is.

Figure 18:
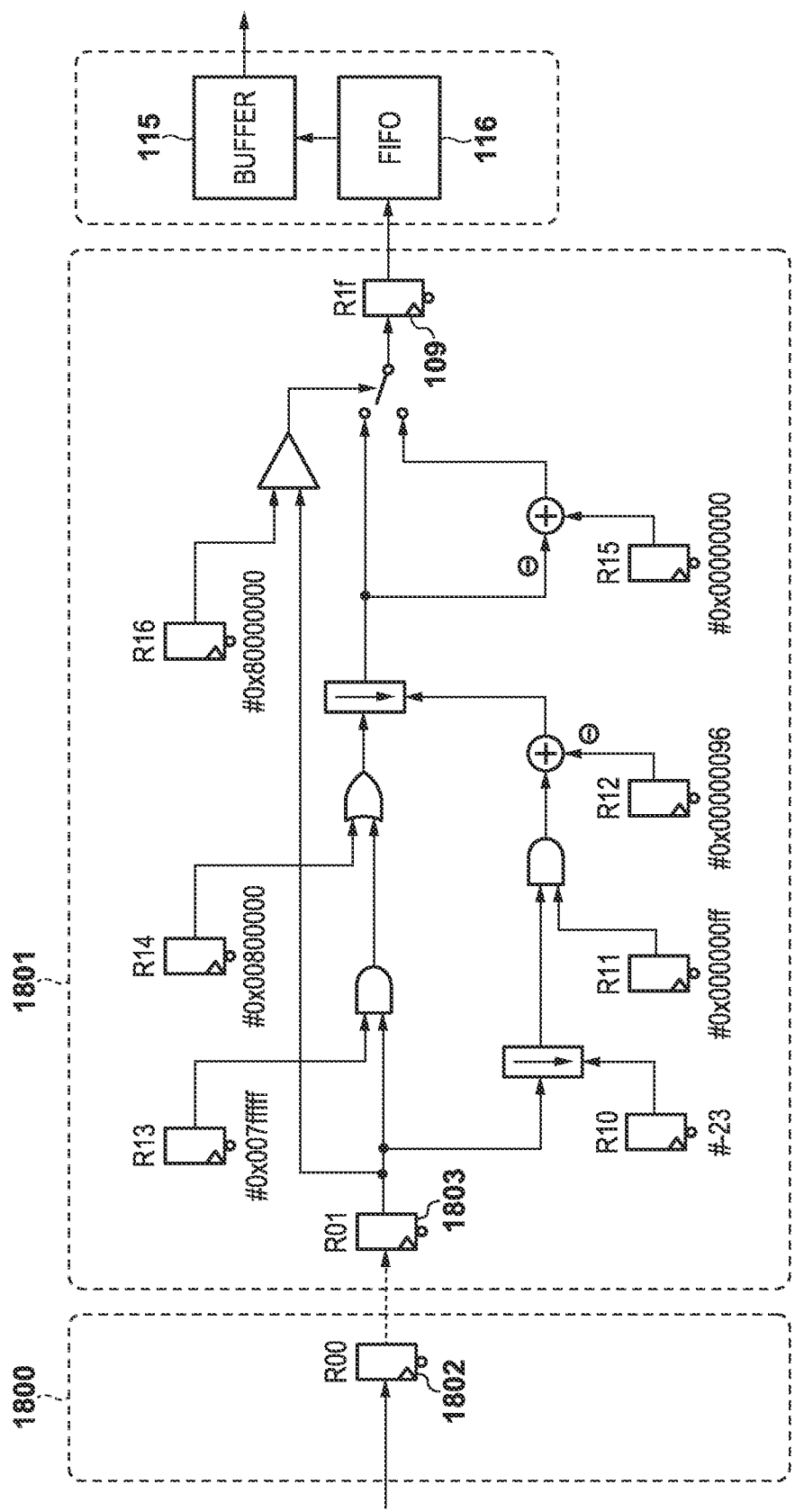
FIG. 18 is an equivalent circuit diagram of a signal processor of the fourth embodiment.

FIG. 18 is an equivalent circuit configuration diagram of the signal processor 1001 according to the fourth embodiment. A reference numeral 1800 corresponds to the setter 104. Then, a register 1802 holds the floating point data to be set by the setter 104. The shift operation transfers data from the register 1802 to the register 1803. The CPU 1005 activates the signal processor 1001 after previously setting fixed values to the registers R10 to R16. The values set in the registers R10 to R16 are as shown in the program list. Note, since there is no shift function from the register R10 to the register R1F, the same value is held.

FIG. 16 shows a list of a program stored in the memory 111 of the first processing unit 110 modeled after the circuit diagram of FIG. 18.

In step 00, the first processing unit 110 shifts the floating point of R01. Then, in step 01, the first processing unit 110 performs mask processing to retrieve an exponent part. Then, in step 02, the first processing unit 110 subtracts the offset for shifting a mantissa part.

In step 03, the first processing unit 110 masks the floating point data held in the register R01 with a value preset in a register R13, and retrieves the mantissa part. Then, in step 04, the first processing unit 110 adds the most significant bit of the mantissa part. This is because, in IEEE 754, the most significant bit of a mantissa part must always be 1.

In step 05, the first processing unit 110 shifts the mantissa part by the value held in the register R02 to form an integer. Then, in step 06, the first processing unit 110 subtracts the register R03 from the value "0" set in advance in the register R15, thereby creating a negative value.

In step 07, the first processing unit 110 obtains the code of the floating point by logical multiplying the register R01 holding the data of the floating point and the value held in the register R16 in advance. Then, in step 09, the first processing unit 110 selects a positive value or a negative value according to the sign, and writes the result to the output register R1f.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-099799, filed Jun. 21, 2022 which is hereby incorporated by reference herein in its entirety.

What is claimed is:

1. A signal processing apparatus comprising:
a central processing unit (CPU); and
a programmable signal processing circuit having the following:
a plurality of execution circuits each of which has a program memory and executes a program stored in the program memory,
wherein the plurality of execution circuits can operate in parallel;
a register file used for the plurality of execution circuits,
wherein the register file has a plurality of registers serially connected and transfers, in accordance with a shift signal, data held by each of the plurality of registers to a register located downstream;
a shift controller that issues the shift signal to the plurality of execution circuits at a timing at which the plurality of execution circuits do not execute the program,
wherein the CPU stores, to each program memory of the plurality of execution circuits, a program including instructions to make a register of the register file located upstream of a register that a second execution circuit of the plurality of execution circuits is to reference in order to input data be a storage destination for data of a result by execution of the program by a first execution circuit of the plurality of execution circuits so that the data of the result by the execution of the program by the first execution circuit is transferred to the second execution circuit via the register file.

2. The signal processing apparatus according to claim 1, wherein the shift controller issues the shift signal to the plurality of execution circuits in a case where each of the plurality of execution circuits has completed execution of one cycle of the program.

3. The signal processing apparatus according to claim 2, wherein each of the plurality of execution circuits stops executing the program in a case where each of the plurality of execution circuits has completed execution of one cycle of the program and executes the program again in accordance with the shift signal.

4. The signal processing apparatus according to claim 2, wherein each of the execution circuits has a program counter and a detector that detects an instruction indicating an end of one cycle of the program,
wherein the program counter stops updating a count value in accordance with a detection signal from the detector and sets a head address of the program to the program counter, and
wherein the shift controller issues the shift signal in a case where the shift controller has received the detection signals from the detectors of all of the plurality of execution circuits.

5. The signal processing apparatus according to claim 1, wherein the execution circuit includes a setting circuit that sets data to be processed to the register,
wherein the programmable signal processing circuit has a reading circuit that has a program memory,
wherein the reading circuit, by executing a program stored in the program memory of the reading circuit, reads the data to be processed from an external memory and outputs the read data to the setting circuit, and
the CPU stores a program for specifying the data to be processed to the program memory of the reading circuit.

6. The signal processing apparatus according to claim 5, wherein the reading circuit outputs the data to be processed to the setting circuit via a FIFO memory, and
wherein the reading circuit, in a case where the FIFO memory has become full, stops reading the data to be processed from the external memory, and in a case where free space has been generated in the FIFO memory, resumes reading.

7. The signal processing apparatus according to claim 1, wherein the register files has an output register that stores data of a result of a predetermined process by the programmable signal processing circuit, and
wherein the CPU stores, to the program memory of an execution circuit that outputs the data of a result of a predetermined process among the plurality of execution circuit, a program including an instruction for storing data obtained by executing the program.

8. The signal processing apparatus according to claim 1, wherein the program memory of each of the plurality of execution circuits and each register of the register file are mapped to different address spaces in a memory space of a predetermined IO bus.

9. The signal processing apparatus according to claim 1, wherein the register file has a plurality of general-purpose registers that hold data unrelated to the shift signal,
wherein the programmable signal processing circuit shifts to a suspended state and an interrupt signal is output to an outside in a case where a predetermined value is stored in a predetermined one of the plurality of general-purpose registers.

10. The signal processing apparatus according to claim 1, wherein the register file has a plurality of general-purpose registers that hold data unrelated to the shift signal, wherein the CPU sets a predetermined value on the general-purpose resister and stores a program including an instruction for using the general-purpose resister to the program memory of the plurality of execution circuits.

11. The signal processing apparatus according to claim 1, wherein the CPU reads the program executed by each of the plurality of execution circuits from a memory, and stores the read program to the program memory of each of the plurality of execution circuits.

12. The signal processing apparatus according to claim 11, wherein the CPU executes the program stored in the memory and controls the image processing apparatus.

13. A non-transitory computer-readable storage medium storing programs to be executed by a signal processing apparatus comprising:
   a central processing unit (CPU); and
   a programmable signal processing circuit having the following:
   a plurality of execution circuits each of which has a program memory and executes a program stored in the program memory,
   wherein the plurality of execution circuits can operate in parallel;
   a register file used for the plurality of execution circuits, wherein the register file has a plurality of registers serially connected and transfers, in accordance with a shift signal, data held by each of the plurality of registers to a register located downstream;
   a shift controller that issues the shift signal to the plurality of execution circuits at a timing at which the plurality of execution circuits do not execute the program,
   wherein the program stored in the storage medium causes the CPU to store, to each program memory of the plurality of execution circuits, a program including instructions to make a register of the register file located upstream of a register that a second execution circuit of the plurality of execution circuits is to reference in order to input data be a storage destination for data of a result by execution of the program by a first execution circuit of the plurality of execution circuits so that the data of the result by the execution of the program by the first execution circuit is transferred to the second execution circuit via the register file.

14. The signal processing apparatus according to claim 1, wherein
   the signal processing apparatus is an image capturing apparatus, and
   wherein the programmable signal processing circuit processes an image signal.

\* \* \* \* \*